United States Patent
Rife, Jr. et al.

(10) Patent No.: US 11,679,639 B2
(45) Date of Patent: Jun. 20, 2023

(54) SYSTEMS AND METHODS FOR CONTROLLING GROUND INCLINATION OF ROTARY CUTTING MACHINES

(71) Applicants: Caterpillar Paving Products Inc., Brooklyn Park, MN (US); Caterpillar Trimble Control Technologies LLC, Dayton, OH (US)

(72) Inventors: Conwell K. Rife, Jr., Wayzata, MN (US); Eric S. Engelmann, Delano, MN (US); Mark A. Tarvin, Canton, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 775 days.

(21) Appl. No.: 16/659,213

(22) Filed: Oct. 21, 2019

(65) Prior Publication Data

US 2020/0122540 A1 Apr. 23, 2020

Related U.S. Application Data

(60) Provisional application No. 62/749,582, filed on Oct. 23, 2018.

(51) Int. Cl.
| | |
|---|---|
| *B60G 17/016* | (2006.01) |
| *B62D 55/084* | (2006.01) |
| *B62D 55/065* | (2006.01) |
| *E01C 23/12* | (2006.01) |
| *E01C 23/088* | (2006.01) |

(52) U.S. Cl.
CPC ......... *B60G 17/016* (2013.01); *B62D 55/065* (2013.01); *B62D 55/084* (2013.01); *B60G 2500/30* (2013.01); *E01C 23/088* (2013.01); *E01C 23/127* (2013.01)

(58) Field of Classification Search
CPC ............ B60G 17/016; B60G 2500/30; B62D 55/065; B62D 55/084; B62D 55/116; E01C 23/088; E01C 23/127
See application file for complete search history.

(56) References Cited

U.S. PATENT DOCUMENTS

| | | | | |
|---|---|---|---|---|
| 3,749,504 A | * | 7/1973 | Smith ................... | E01C 19/008 |
| | | | | 404/84.2 |
| 3,843,274 A | * | 10/1974 | Gutman ................ | E01C 19/002 |
| | | | | 404/91 |
| 4,041,623 A | * | 8/1977 | Miller ................... | E01C 19/008 |
| | | | | 180/9.5 |

(Continued)

FOREIGN PATENT DOCUMENTS

| | | |
|---|---|---|
| DE | 102014019168 | 6/2016 |
| EP | 2708969 | 3/2014 |

(Continued)

*Primary Examiner* — Frank B Vanaman

(74) *Attorney, Agent, or Firm* — Schwegman, Lundberg & Woessner (57) ABSTRACT

A machine for road work can comprise a frame, a plurality of ground engaging units, a plurality of vertically moveable legs, each leg connecting one of the plurality of ground engaging units to the frame, a pair of spatial sensors, such as global navigation satellite system (GNSS) sensors, and a controller configured to, in response to a three-dimensional signal received from each of the spatial sensors, activate at least some of the plurality of vertically moveable legs.

20 Claims, 5 Drawing Sheets

(56) References Cited

U.S. PATENT DOCUMENTS

| | | | | |
|---|---|---|---|---|
| 4,139,318 A | * | 2/1979 | Jakob | E01C 23/088 37/219 |
| 4,982,979 A | * | 1/1991 | Akatsu | B60G 17/017 280/124.161 |
| 5,410,478 A | * | 4/1995 | Richard | B62D 55/065 180/9.1 |
| 6,152,648 A | | 11/2000 | Gfroerer et al. | |
| 8,424,972 B2 | | 4/2013 | Berning et al. | |
| 8,874,325 B2 | | 10/2014 | Killion | |
| 8,899,689 B2 | | 12/2014 | Killion | |
| 8,998,344 B2 | | 4/2015 | Berning et al. | |
| 9,121,146 B2 | | 9/2015 | Paulsen et al. | |
| 9,206,566 B2 | | 12/2015 | Killion | |
| 9,803,478 B2 | | 10/2017 | Müller et al. | |
| 9,956,842 B2 | | 5/2018 | Muir et al. | |
| 10,011,974 B2 | | 7/2018 | Zhang et al. | |
| 2002/0047301 A1 | * | 4/2002 | Davis | E01C 19/006 299/1.5 |
| 2007/0098494 A1 | | 5/2007 | Mares | |
| 2008/0152428 A1 | * | 6/2008 | Berning | E01C 23/088 404/84.1 |
| 2012/0301220 A1 | * | 11/2012 | Snoeck | E01C 23/085 701/50 |
| 2013/0162003 A1 | * | 6/2013 | Killion | E01C 23/088 299/1.5 |
| 2015/0284918 A1 | * | 10/2015 | Fritz | E01C 23/127 299/1.5 |
| 2018/0135258 A1 | | 5/2018 | Berning et al. | |

FOREIGN PATENT DOCUMENTS

| | | |
|---|---|---|
| EP | 2719829 | 4/2014 |
| EP | 2927372 | 10/2015 |
| EP | 3034698 | 6/2016 |

* cited by examiner

SYSTEMS AND METHODS FOR CONTROLLING GROUND INCLINATION OF ROTARY CUTTING MACHINES

CLAIM OF PRIORITY

This application claims the benefit of priority to U.S. Provisional Application Ser. No. 62/749,582, filed on Oct. 23, 2018, which is incorporated herein by reference in its entirety.

TECHNICAL FIELD

The present application relates generally, but not by way of limitation, to ride control systems and methods for machines that can be used to remove or recycle paved surfaces, such as cold planer machines and rotary mixer machines. More particularly, but not by way of limitation, the present application relates to systems and methods used to control ground inclination for such machines.

BACKGROUND

Cold planer machines and rotary mixer machines can be used to mill or grind-up old or degraded pavement from surfaces such as roadways and parking lots. Cold planers can be configured to remove the pavement for transportation away from the surface, while rotary mixers can be configured to reconstitute or recycle the pavement for reuse at the surface. The surfaces can extend over uneven terrain. As such, these machines can include systems for adjusting the vertical height of the machine and a rotary cutting tool attached thereto in order to, for example, control the cutting depth and provide a smooth ride for the operator.

U.S. Pat. No. 8,874,325 to Killion, entitled "Automatic Four Leg Leveling For Cold Planers," discloses methods comprising "equalizing the legs of the machine prior to extending or retracting the legs of the machine to raise or lower the machine during non-milling operational status" and "extending or retracting the legs during milling operational status while maintaining the relative lengths of each leg."

DETAILED DESCRIPTION

Figure 1:
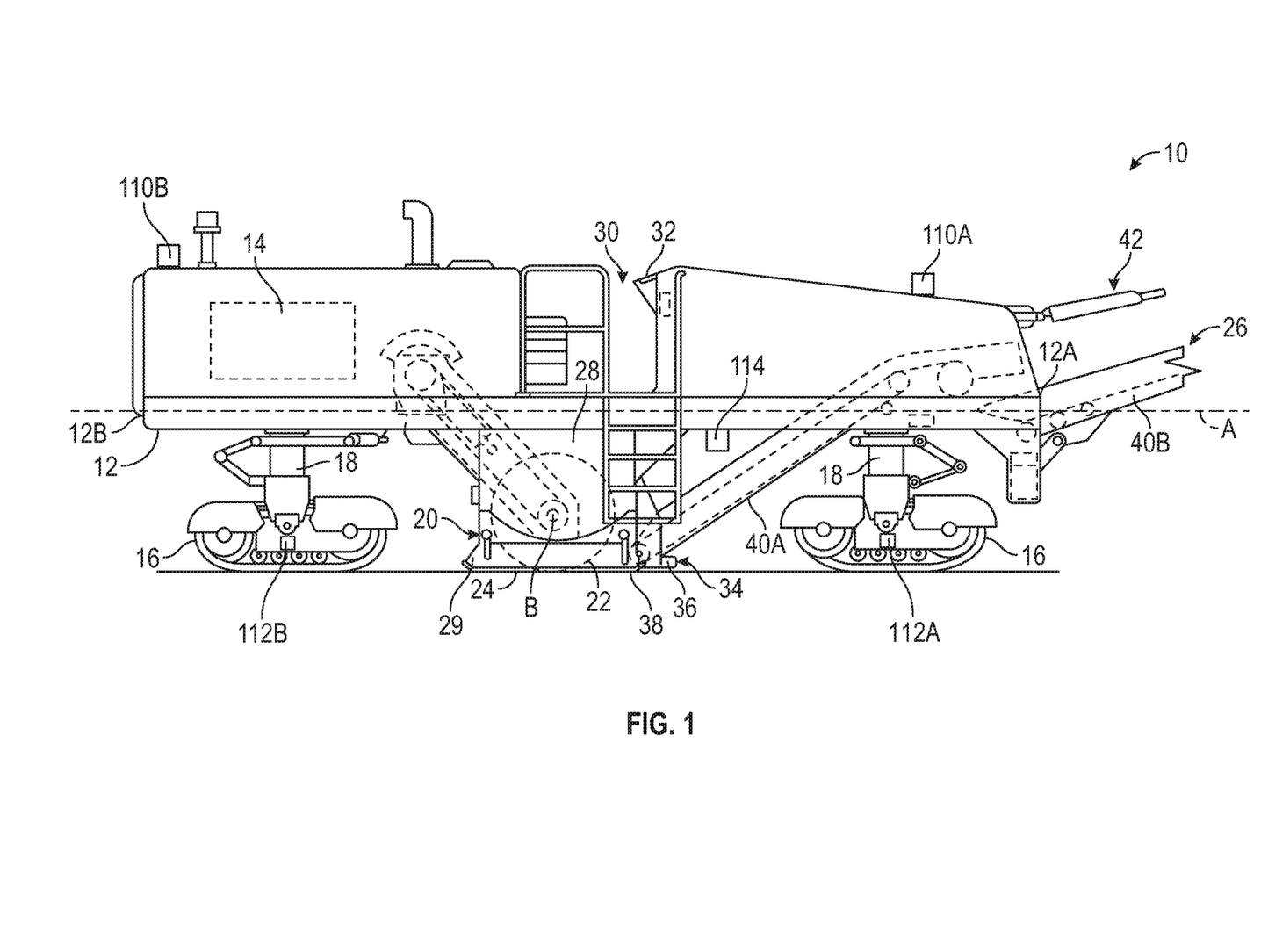
FIG. 1 is a schematic side view of a cold planer machine showing a milling system, an anti-slabbing system, a conveyor system and a plurality of transportation devices mounted to lifting columns.

FIG. 1 is a schematic side view of cold planer machine 10 showing frame 12 to which power source 14 and transportation devices 16 can be connected. Transportation devices 16 can be connected to frame 12 via lifting columns 18. Milling assembly 20 can, for example, be coupled to the underside of frame 12 between transportation devices 16. Although the present application is described with reference to a cold planer machine including a milling drum and conveyors, the present invention is applicable to other types of machines mounted on individually articulatable propulsion devices, such as rotary mixing machines as further described below.

Frame 12 can longitudinally extend between first end 12A and second end 12B along frame axis A. Power source 14 can be provided in any number of different forms including, but not limited to, internal combustion engines, electric motors, hybrid engines and the like. Power from power source 14 can be transmitted to various components and systems of machine 10, such as transportation devices 16 and milling assembly 20.

Frame 12 can be supported by transportation devices 16 via lifting columns 18. Transportation devices 16 can be any kind of ground-engaging device that allows cold planer machine 10 to move over a ground surface such as a paved road or a ground already processed by cold planer machine 10. For example, in the illustrated embodiment, transportation devices 16 are configured as track assemblies or crawlers. However, in other examples, transportation devices 16 can be configured as wheels, such as inflatable and hard tires. Transportation devices 16 can be configured to move cold planer machine 10 in forward and backward directions along the ground surface in the direction of axis A. Lifting columns 18 can be configured to raise and lower frame 12 relative to transportation devices 16 and the ground. One or more of lifting columns 18 can be configured to rotate along a vertical axis, e.g. perpendicular to axis A, to provide steering for cold planer machine 10.

Cold planer machine 10 can comprise four transportation devices 16 a front left transportation device, a front right transportation device, a rear left transportation device and a rear right transportation device, each of which can be connected to a lifting column. That is, additional propulsion devices 16 and lifting columns 18 can be provided adjacent propulsion devices 16 shown in FIG. 1 further into the plane of FIG. 1, as can be seen in FIG. 3. However, in other examples, cold planar machine 10 can utilize fewer than four transportation devices, such as three. Although, the present disclosure is not limited to any particular number of propulsion devices or lifting columns. Lifting columns 18 can be provided to raise and lower frame 12 to, for example, control a cutting depth of milling drum 22 and to accommodate cold planer machine 10 engaging obstacles on the ground. As described herein, lifting columns 18 can be coupled to a hydraulic system that can be operated by controller 132 (FIG. 2) in response to receiving feedback from one or more spatial sensors 110A and 110B, such as, but not limited to, global navigation satellite system (GLASS) sensors, laser-based sensing in 2D and 3D space, cameras, and LIDAR. In examples, spatial sensors 110A and 110B can be sensors that provide two data points that can be referenced to each other or another common reference point to provide one-, two-, or three-dimensional orientation information of frame 12. In some embodiments, the one or more sensors 110A and 110B can be used in combination with one or more auxiliary sensors 114, such as a slope sensor, and propulsor sensors 112A and 112B, that can further enhance the spatial data (e.g., latitude, longitude and altitude) from the sensors 110A and 110B. Although described with reference to propulsor sensors 112A and 112B for the pair of lifting columns 18 shown in FIG. 1, cold planar machine 10 can include a propulsor sensor 112 for each leg or lifting column included on cold planer machine 10. As such, two additional propulsor sensors can be provided in addition to propulsor sensors 112A and 112B further into the plane of FIG. 1.

Cold planer machine 10 can further include milling assembly 20 connected to frame 12. Milling assembly 20 can comprise rotatable milling drum 22 operatively connected to power source 14. Milling drum 22 can include a plurality of cutting tools, such as chisels, disposed thereon. Milling drum 22 can be rotated about a drum or housing axis B extending in a direction perpendicular to frame axis A into the plane of FIG. 1. As rotatable milling drum 22 spins or rotates about drum axis B, the cutting tools can engage work surface 24, which can comprise asphalt or concrete for example, of existing roadways, bridges, parking lots and the like. Moreover, as the cutting tools engage work surface 24, the cutting tools remove layers of materials forming work surface 24, such as hardened dirt, rock or pavement. The spinning action of rotatable drum 22 and the cutting tools then transfers the material of work surface 24 to conveyor system 26. However, as discussed below rotary mixers can recycle material into the work surface.

Milling assembly 20 can further comprise drum housing 28 forming a chamber for accommodating milling drum 22, Drum housing 28 can include front and rear walls, and a top cover positioned above milling drum 22. Furthermore, drum housing 28 can include lateral covers, or sideplates 29 (see sideplates 124 of FIG. 2), on the left and right sides of milling drum 22 with respect to a travel direction of cold planer machine 10. Drum housing 28 can be open toward the ground so that milling drum 22 can engage the ground from drum housing 28. Furthermore, drum housing 28 can be removed from frame 12 for maintenance, repair and transport.

In embodiments applicable to rotary mixers, drum housing 28 can be configured to contain milling drum 22 and form a mixing chamber. As such, milling drum 22 can be configured to contact a work surface during travel of the machine to reclaim and/or pulverize the work surface, such as by mixing reclaimed soil or paving material with various additives or aggregates deposited on the work surface. Thus, a rotary mixing machine of the present application can include systems for depositing an additive, such as Portland cement, lime, fly ash, cement kiln dust, etc., on the work surfaces during the reclaiming or pulverizing operations.

Cold planer machine 10 can further include operator station or platform 30 including control panel 32 for inputting commands to control system 100 (FIG. 2) for controlling cold planer machine 10, and for outputting information related to an operation of cold planer machine 10. As such, an operator of cold planer machine 10 can perform control and monitoring functions of cold planer machine 10 from platform 30, such as by observing various data output by sensors located on cold planer machine 10, such as sensors 110A and 110B, leg position sensors 122 (FIG. 2), auxiliary sensor(s) 114 and propulsor sensors 112A and 112B. Furthermore, control panel 32 can include controls for operating transportation devices 16 and lifting columns 18.

Anti-slabbing system 34 can be coupled to drum housing 28 and can include an upwardly oriented base plate (not visible in FIG. 1) extending across a front side of the cutting chamber, a forwardly projecting plow 36 for pushing loose material lying upon work surface 24, and a plurality of skids 38.

Primary conveyor 40A can be positioned forward of milling drum 22 and can be coupled to and supported upon the base plate of anti-slabbing system 34. Primary conveyor 40A can feed material cut from work surface 24 via milling drum 22 to secondary conveyor 40B projecting forward of frame end 12A, Positioning mechanism 42 can be coupled to secondary conveyor 40B, to enable left, right, up and down position control of secondary conveyor 40B. Secondary conveyor 40B can deposit removed pieces of work surface 24 into a receptacle, such as the box of a dump truck. In other construction machines, such as rotary mixer embodiments, conveyors 40A and 40B can be omitted.

Cold planer machine 10, as well as other exemplary road construction machines such as rotary mixers, can include further components not shown in the drawings, which are not described in further detail herein. For example, cold planer machine 10 can further include a fuel tank, a cooling system, a milling fluid spray system, various kinds of circuitry and computer related hardware, etc.

Cold planer machine 10 can drive over work surface 24 such that front transportation devices 16 roll over work surface 24. Cold planer machine 10 can be configured to remove work surface 24 from a roadway to leave a planed surface behind. Rear transportation devices 16 can roll on the planed surface, with milling assembly 20 producing an edge of the material of work surface 24 between milled and un-milled surfaces of work surface 24. The milled surface can comprise a surface from which paving material has been completely removed or a surface of paving material from which an upper-most layer of paving material has been removed, or a surface comprising material mixed by milling assembly 20.

Cold planer machine 10 can be configured to travel in a forward direction (from left to right with reference to FIG. 1) to remove work surface 24, Anti-slabbing system 34 can travel over the top of work surface 24 to prevent or inhibit work surface 24 from becoming prematurely dislodged during operations for removal of work surface 24. Milling drum 22 can follow behind anti-slabbing system 34 to engage work surface 24. Milling drum 22 can be configured to rotate counter-clockwise with reference to FIG. 1 such that material of work surface 24 can be uplifted and broken up into small pieces by cutting teeth or chisels of milling drum 22. Anti-slabbing system 34 can be configured to contain pieces of work surface 24 within drum housing 28. Removed pieces of work surface 24 can be pushed up primary conveyor 40A and carried forward, such as by an endless belt, to secondary conveyor 40B. Secondary conveyor 40B, which can also include an endless belt, can be cantilevered forward of front frame end 12A to be positioned over a collection vessel, such as the box of a dump truck.

During the course of moving over work surface 24, either with milling drum 22 engaging work surface 24 in an operating mode or with milling drum retracted to a transport or ride control mode, transportation devices 16 can encounter obstacles, such as depressions or protrusions, which can be rolled over by transportation devices 16. Such obstacles can cause rods or pistons of lifting columns 18 to be pushed inward into a cylinder of lifting columns 18 or to extend further outward from the cylinder, as the hydraulic system operates to redistribute hydraulic fluid within the system to each cylinder. Because, for example, the hydraulic system cannot redistribute hydraulic fluid fast enough or is not configured to redistribute hydraulic fluid at all, sometimes these movements can be jarring to an operator of cold planer machine 10, such as those disposed in operator platform 30, or can potentially interfere with a cut being produced by milling drum 22. In a transport mode, e.g., a ride control mode, where milling drum 22 is raised from work surface 24 and cold planer machine 10 is being driven at a higher speed, relative to a speed at which milling is typically conducted, to a different location to perform milling or to be loaded onto a truck for transportation, these movements can be particularly jarring.

The present application is directed to systems and methods for monitoring and controlling movements of lifting columns 18 to, for example, reduce operator discomfort by reducing jarring or sudden movements of lifting columns 18, maintain orientation of frame 12, and maintain desired cut characteristics of milling drum 22. In particular examples, output from one or both of sensors 110A and 110B, alone or in combination with output from one or more of auxiliary sensor 114, which, in an example, can be used to monitor position of milling drum 22, position sensors 122 (FIG. 2), Which can be used to determine the length of lifting columns 18, and propulsor sensors 112A and 112B, which can be used to determine the angle of propulsors 16 relative to lifting columns 18, can be used to maintain or alter orientation of frame 12 and cold planer machine 10 either by manual operator interaction or automatic operation of a system controller to adjust one or more of lifting columns 18.

Figure 2:
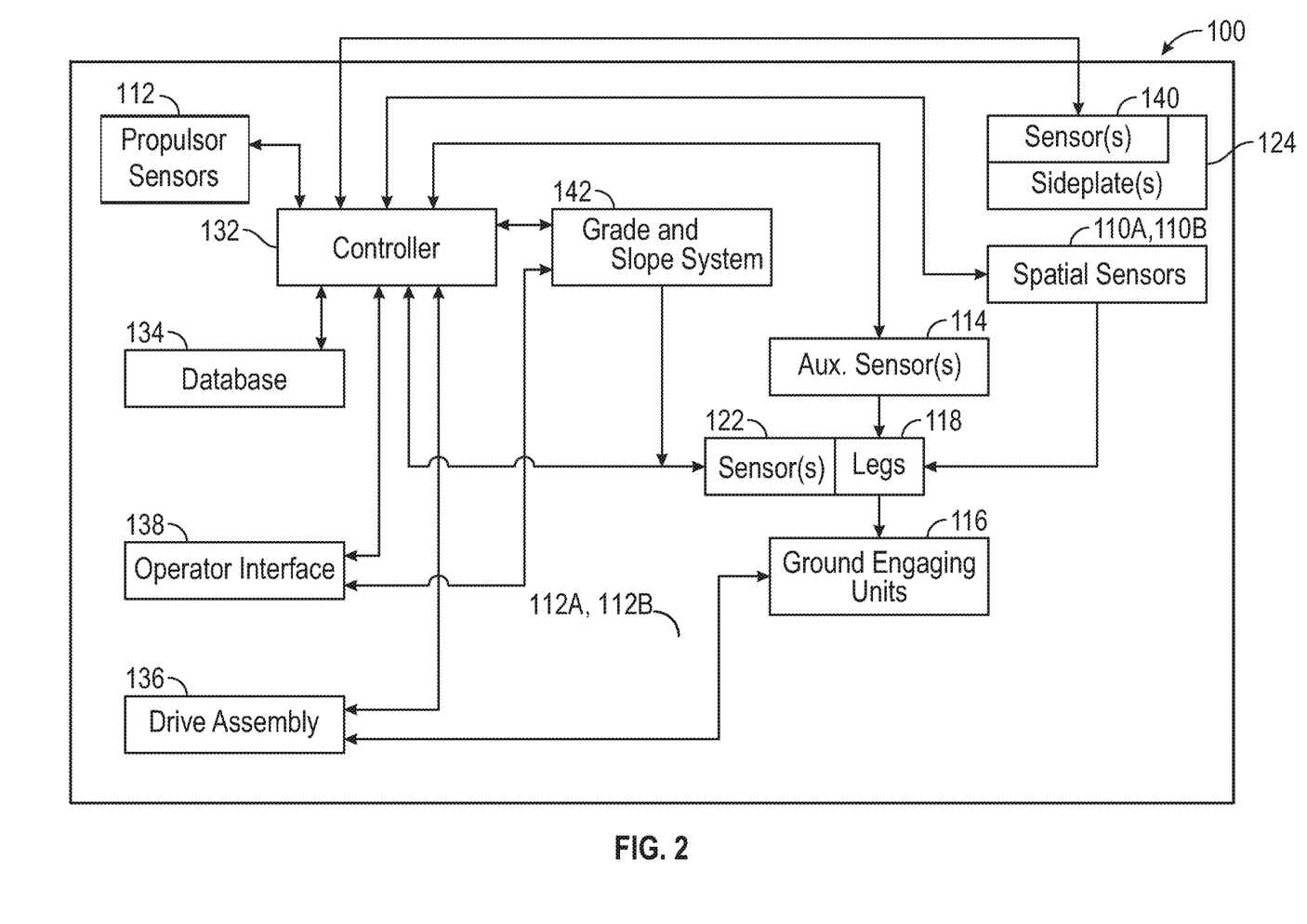
FIG. 2 is a schematic diagram of a control system for the cold planer machine of FIG. 1 illustrating a controller in communication with lifting column sensors, spatial sensors and auxiliary sensors.
Figure 3:
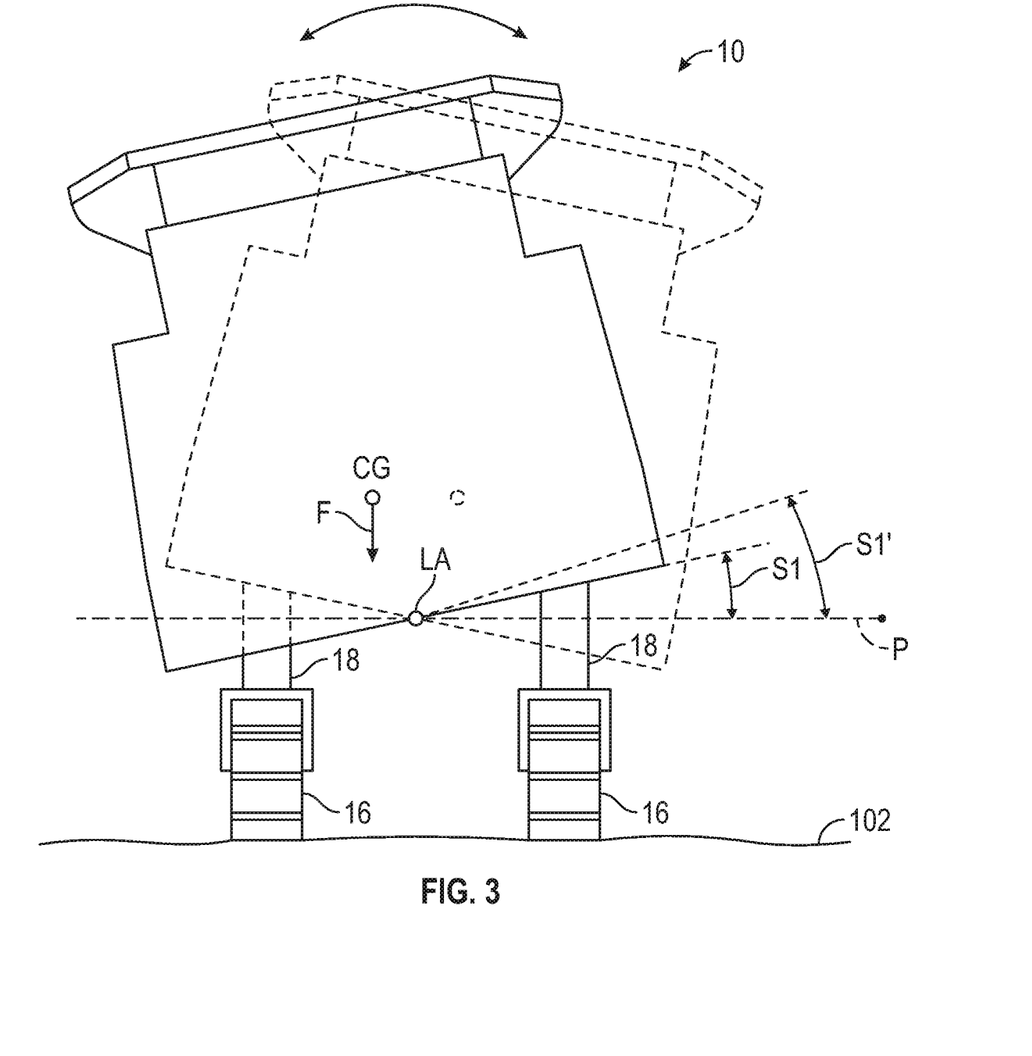
FIG. 3 is a schematic illustration showing movement of the cold planer machine of FIG. 1 about a longitudinal axis.

FIG. 2 is an illustration of control system 100 for cold planer machine 10. Control of cold planer machine 10 can be managed by one or more embedded or integrated controllers 132 of cold planer machine 10. Controller 132 can comprise one or more processors, microprocessors, microcontrollers, electronic control modules (ECMs), electronic control units (ECUs), programmable logic controller (PLC) or any other suitable means for electronically controlling functionality of cold planer machine 10.

Controller 132 can be configured to operate according to a predetermined algorithm or set of instructions for controlling cold planer machine 10 based on various operating conditions of cold planer machine 10, such as can be determined from output of various sensors including sensors 110A and 110B. Such an algorithm or set of instructions can be stored in database 134, can be read into an on-board memory of controller 132, or preprogrammed onto a storage medium or memory accessible by controller 132, for example, in the form of a floppy disk, hard drive, optical medium, random access memory (RAM), read-only memory (ROM), or any other suitable computer readable storage medium commonly used in the art (each referred to as a "database"), which can be in the form of a physical, non-transitory storage medium.

Controller 132 can be in electrical communication or connected to drive assembly 136, or the like, and various other components, systems or sub-systems of cold planer machine 10. Drive assembly 136 can comprise an engine, a hydraulic motor, a hydraulic system including various pumps, reservoirs and actuators, among other elements (such as power source 14 of FIG. 1). By way of such connection, controller 132 can receive data pertaining to the current operating parameters of cold planer machine 10 from sensors, such as sensors 110A and 110B, propulsor sensors 112A and 112B, auxiliary sensor 114, position sensors 122, sideplate sensors 140, and the like. In response to such input, controller 132 can perform various determinations and transmit output signals corresponding to the results of such determinations or corresponding to actions that need to be performed, such as for producing forward and rearward movement using ground engaging units 116 (such as transportation devices 16 of FIG. 1) or producing up and down movements of lifting columns 18.

Controller 132, including operator interface 138, can include various output devices, such as screens, video displays, monitors and the like that can be used to display information, warnings, data, such as text, numbers, graphics, icons and the like, regarding the status of cold planer machine 10. Controller 132, including operator interface 138, can additionally include a plurality of input interfaces for receiving information and command signals from various switches and sensors associated with cold planer machine 10 and a plurality of output interfaces for sending control signals to various actuators associated with cold planer machine 10. Suitably programmed, controller 132 can serve many additional similar or wholly disparate functions as is well-known in the art.

With regard to input, controller 132 can receive signals or data from operator interface 138 (such as at control panel 32 of FIG. 1), sensors 110A and 110B, propulsor sensors 112A and 112B, auxiliary sensor 114, position sensors 122, sideplate sensors 140, and the like. As can be seen in the example illustrated in FIG. 2, controller 132 can receive signals from operator interface 138. Such signals received by controller 132 from operator interface 138 can include, but are not limited to, an all-leg raise signal and an all-leg lower signal for lifting columns 18. In some embodiments, front legs 118 (such as lifting columns 18 of FIG. 1) can be controlled individually directly, while rear legs 118 (such as lifting columns 18 of FIG. 1) are controlled together indirectly based off movements of the front legs.

Controller 132 can also receive position and/or length data from each position sensor 122. As noted before, such data can include, but is not limited to, information as to the lengths of legs 118 or the amount of extension or retraction of the leg 118. Such information can be used to determine an orientation of frame 12 relative to propulsors 16.

Controller 132 can also receive data from one or more sideplate sensors 140. Such data can include, but is not limited to, information related to the vertical position of sideplates 124 (e.g., sideplates 29) and/or whether sideplates 124 are in contact with surface 102 (such as the top of work surface 24 of FIG. 1). Such data can also be used to determine a difference in the height of work surface 24 on either side of milling drum 22 (FIG. 1)

Controller 132 can receive data from sensors 110A and 110B, Such data can include, but is not limited to, information related to latitudinal and longitudinal location of machine 10, the altitude of machine 10, the velocity and acceleration of machine 10, and the bearing or heading of machine 10. Such information can be used to four-dimensionally map data of machine 10 in time and space. Furthermore, such data can be used to determine the orientation of frame 12 to, for example, perform ride control operations of machine 10, e.g. operations of machine 10 when milling drum 22 is disengaged, to maintain safe and comfortable operation of machine 10.

Controller 132 can also receive data from other controllers, grade and slope system 142 for cold planer machine 10, operator interface 138, and the like. In examples, another controller can provide information to controller 132 regarding the operational status of cold planer machine 10. In other examples, such information can be provided by grade and slope system 142, a hydraulic system controller or the like, to controller 132. The operation status received can include whether cold planer machine 10 is in non-milling operational status or milling operational status (e.g., milling drum 22 is not spinning or milling drum 22 is spinning). In examples, grade and slope system 142 can receive and process data from operator interface 138 related to the operator desired depth of the cut, the slope of the cut, and the like. Grade and slope system 142 can comprise one or more auxiliary sensors 114. In examples, auxiliary sensor 114 can comprise a slope sensor configured to sense the longitudinal (e.g., front-to-hack) and transverse (e.g., left-to-right) orientations of frame 12. As discussed with reference to FIGS. 4 and 5, slope sensor 112 can detect rotation along longitudinal axis LA and transverse axis TA.

System 100 can be configured to adjust the position and orientation of frame 12 based on input from one or a combination of various sensors of cold planer machine 10, such as sensors 110A and 110B, propulsor sensors 112A and 112B, position sensors 122 and auxiliary sensor 114. In particular, controller 132 can be, in various examples, configured to detect changes in altitude of first end 12A and second end 12B of frame 12 based on input from sensors 110A and 110B associated with a change in topography of the surface over which cold planer machine 10 is traversing, such as surface 24. For example, as one of transportation devices 16 engages a protrusion in surface 24 or a depression in surface 24, an associated altitude spike or altitude drop, respectively, can occur at first end 124 or second end 12B. Controller 132 can, in response to a sudden altitude change at one of ends 12A and 123 cause one or more lifting columns 18 to change height, such as by inducing a hydraulic fluid volume change in one of more of hydraulic cylinders associated with lifting columns 18, to return frame 12 to a desired orientation. Additionally, an operator of cold planer machine 10 can manually receive information from controller 132, such as via operator interface 138, and manually adjust the height of lifting columns 18.

System 100 can include a slope sensor disposed on frame 12. In an example, auxiliary sensor 114 can comprise the slope sensor. In an example, such slope sensor can be positioned near the longitudinal and lateral center of frame 12 and can be configured to generate a signal indicative of the slope of cold planer machine 10. The slope of cold planer machine 10 can be defined with respect to a movement of frame 12 about longitudinal axis LA (FIG. 3), which can be coincident with axis A of FIG. 1, extending in a direction of travel of machine 10, and transverse axis TA (FIG. 4) extending left-to-right across machine 10 perpendicular to longitudinal axis LA. The slope of cold planer machine 10 can be defined with respect to a movement of cold planer machine 10 and with respect to a horizontal reference plane P perpendicular to a direction of a gravitational force F of cold planer machine 10. The gravitational force F can correspond to a force caused by a weight of cold planer machine 10 at a center of gravity CG thereof towards the ground surface 102.

System 10 can include one or more spatial sensors disposed on frame 12, as an alternative or in addition to a slope sensor. Sensors 110A and 1103 can be configured to utilize any type of known satellite system technology and each sensor can provide a three-dimensional signal corresponding to a three-dimensional position of the particular sensor on frame 12. In examples, sensors 110A and 110B can use global positioning system (GPS) sensor technology, Globalnaya Navigazionnaya Spumikovaya Sistema (GLONASS) sensor technology, Galileo navigation system sensor technology and BeiDou Navigation Satellite System (BDS) sensor technology. In additional examples, spatial sensors 110A and 110B can comprise laser-based sensors for sensing in 2D or 3D, camera-based sensing system sensors and LIDAR-based sensing system sensor. By obtaining a three-dimensional position for each sensor 110A and 110B, a positional vector of the machine can be created and the slope of the machine can be extrapolated. In an example, the spatial data, e.g., one-, two- or three-dimensional data, from the sensors 110A and 110B can facilitate creation of a plane corresponding to plane P described above. With the three-dimensional data from the sensors 110A and 110B, the slopes of the machine can be extrapolated with respect to one or more of the following positions: left-right, up-down, and forward-aft.

Frame 12 can have four corners—front right, front left, back right and back left. In an example, sensor 110A can be located on a front portion of the frame 12 near first end 12A and sensor 110B can be located on a back portion of the frame 12 near second end 12B. In an example, sensor 110A can be located in proximity to the front right corner and sensor 110B can be located in proximity to the back left corner such that sensors 110A and 110B are oriented trans-diagonally to one another. In an example, sensor 110A can be located in proximity to the front left corner and sensor 110B can be located in proximity to the back right corner. In another example, a sensor can be located in each of the four corners of the frame 12 such that system 10 can have two pairs of trans-diagonal sensors 110A and 110B. In another example, a single sensor can be used in combination with an auxiliary sensor such as a slope sensor.

In an example, sensors 110A and 110B can be used in combination with auxiliary sensor 114 which can enhance the data provided by the sensors 110A and 110B. The auxiliary sensor 114 can also be described herein as an additional sensor. It is recognized that, in some examples, auxiliary sensor 114 can be excluded from system 100, and, in other examples, auxiliary sensor 114 can be included in system 100, but selectively used during operation of machine 10. In an example, auxiliary sensor 114 can include one sensor or a plurality of sensors. In an example, auxiliary sensor 114 can include a slope sensor, such as the slope sensor described above. In an example, auxiliary sensor 114 can include a sensor that can determine orientation about six degrees of freedom.

In the illustrated embodiment, auxiliary sensor 114 is located on frame 12 between the front and rear transportation devices 16, as shown in FIG. 1. Auxiliary sensor 114 can additionally be located between left and right transportation devices 16. In additional embodiments, auxiliary sensor 114 can be disposed on frame 12 around an intersecting location defined by longitudinal axis LA and the transverse axis TA of cold planer machine 10. In other embodiments, auxiliary sensor 114 can be disposed at any location in frame 12 to generate the signal indicative of the slope of cold planer machine 10. In yet additional embodiments, a plurality of auxiliary sensors 114 can be disposed at various locations in or on frame 12 of cold planer machine 10.

Figure 4:
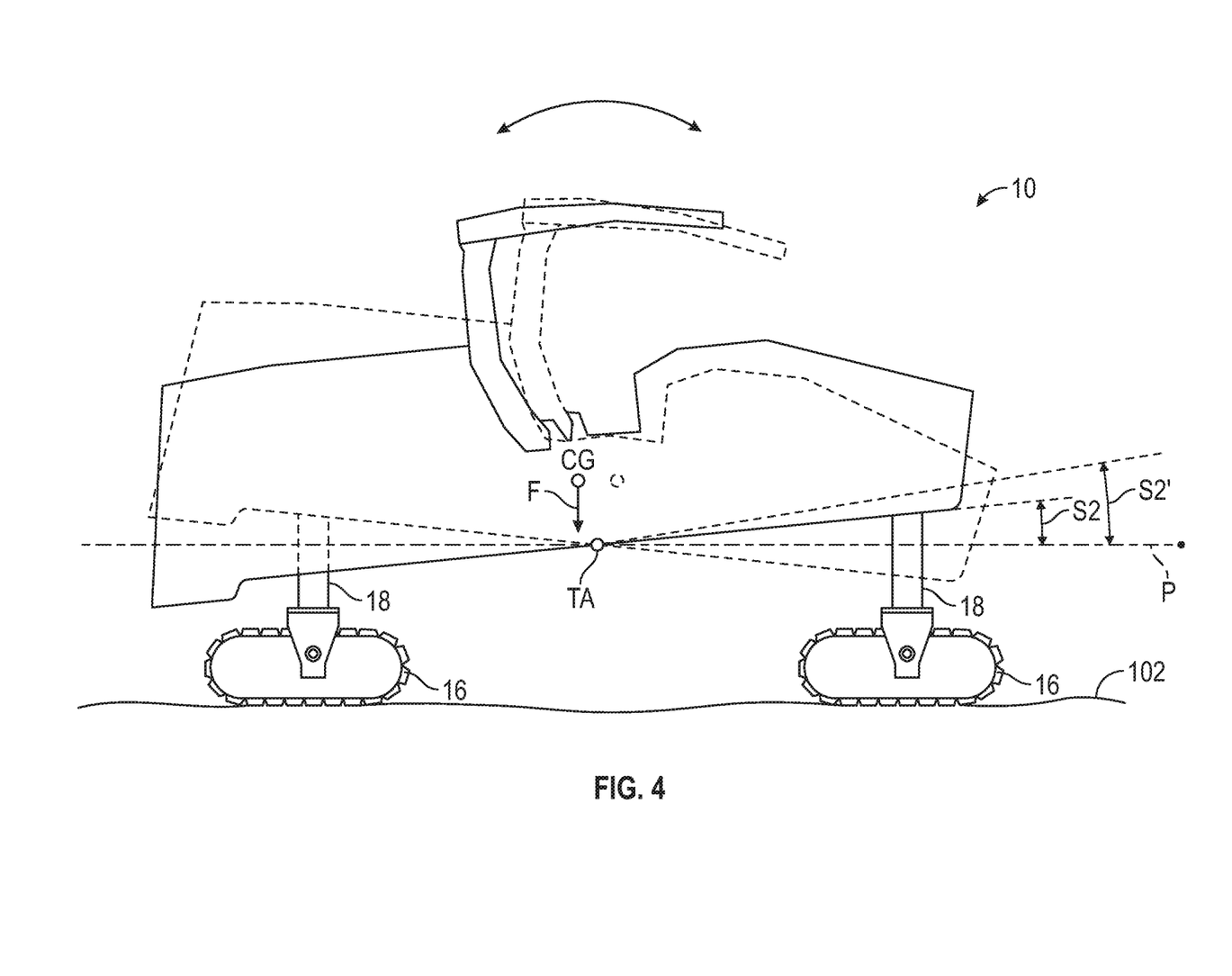
FIG. 4 is a schematic illustration showing movement of the cold planer machine of FIG. 1 about a transverse axis.

In examples in which auxiliary sensor 114 is a slope sensor, auxiliary sensor 114 can comprise a dual-axis sensor for sensing movement along transverse axis TA and longitudinal axis LA. (FIG. 4). In additional examples, auxiliary sensor 114 can include a gyro sensor. The gyro sensor can be configured to generate signals indicative of rotational attributes of cold planer machine 10, such as a pitch and a roll. The pitch can correspond to the movement of cold planer machine 10 about the transverse axis TA and the roll can correspond to the movement of cold planer machine 10 about the longitudinal axis LA. In various examples, auxiliary sensor 114 can include a sensor device, an angle measurement device, a force balancing member, a solid state member, a fluid filled device, an accelerometer, a tilt switch or any other device that can determine the slope of cold planer machine 10 with respect to one or more of the various reference parameters including, but not limited to, the longitudinal axis LA and the transverse axis TA of cold planer machine 10, the reference plane P and the ground surface 102.

Controller 132 can be in communication with sensors 110A and 110B and auxiliary sensor 114 (in those examples in which sensor 114 is included in system 100). Controller 132 can be configured to receive a spatial, e.g., three-dimensional, signal from each of the sensors 110 and such signals can be used to determine slope of cold planer machine 10 about the longitudinal axis LA and the transverse axis TA thereof. Controller 132 can be disposed at operator interface 32, but can be disposed on any location on frame 12.

Controller 132 can further be configured to be in communication with a hydraulic system controlling operation and position of lifting columns 18, in examples, the hydraulic system can be configured according to the disclosure of Pub. No. US 2007/0098494 A1 to Mares, which is hereby incorporated in its entirety by this reference. In examples, the hydraulic system can include a reservoir for containing a hydraulic fluid and one or more pumps to communicate the hydraulic fluid with lifting columns 18 and transportation devices 16. One or more direction control valves can be disposed in the hydraulic system to control direction of flow of the hydraulic fluid. Furthermore, additional control valves, such as check valves, pressure relief valves, pressure regulating valves, and the like can be disposed in the hydraulic system for generating required hydraulic power for actuation of the transportation devices 16 and lifting columns 18. Controller 132 can be in communication with the one or more pumps, motors, directional control valves and additional control valves to control the flow of the hydraulic fluid to each of transportation devices 16 and lifting columns 18. Thus, the hydraulic system in communication with controller 132 can be configured to actuate each of the transportation devices 16 and lifting columns 18 individually or in various combinations and sub-combinations based on one or more inputs received from controller 132. Likewise, control panel 32 can include operator inputs to control the hydraulic system through controller 132. Additionally, the hydraulic system or a separate hydraulic system can be in communication with transportation devices 16 to provide hydraulic fluid for motive force for transportation devices 16 that can be additionally controlled by controller 132.

In an example, controller 132 can be configured to determine a first slope S1 of cold planer machine 10 based on the signals received from sensors 110A and 110B. The first slope S1 is a first angle defined by the longitudinal axis LA of cold planer machine 10. The first slope S1 is further defined with reference to the reference plane P perpendicular to the gravitational force F of cold planer machine 10. Controller 132 in communication with the sensors 110A and 110B can receive a signal corresponding to the movement of cold planer machine 10 about the longitudinal axis LA thereof to determine the first slope S1. In various embodiments, controller 132 can determine the first slope S1 based on the reference parameters including the movement of cold planer machine 10 about the longitudinal axis LA, the reference plane P and the ground surface 102.

Controller 132 can be configured to determine a second slope S2 of cold planer machine 10 based on the signals received from sensors 110A and 110B. The second slope S2 is a first angle defined by the transverse axis TA of cold planer machine 10. The second slope S2 is further defined with reference to the reference plane P perpendicular to the gravitational force F of cold planer machine 10. Controller 132 in communication with sensors 110A and 110B can receive a signal corresponding to the movement of cold planer machine 10 about the transverse axis TA thereof to determine the second slope S2. In various embodiments, controller 132 can determine the second slope S2 based on the reference parameters including the movement of cold planer machine 10 about the transverse axis TA, the reference plane P and the ground surface 102.

In an example, one or more of auxiliary sensors 114 and propulsor sensors 112A and 112B can be used in combination with the sensors 110A and 110B in determining first slope S1 and second slope S2.

Figure 5:
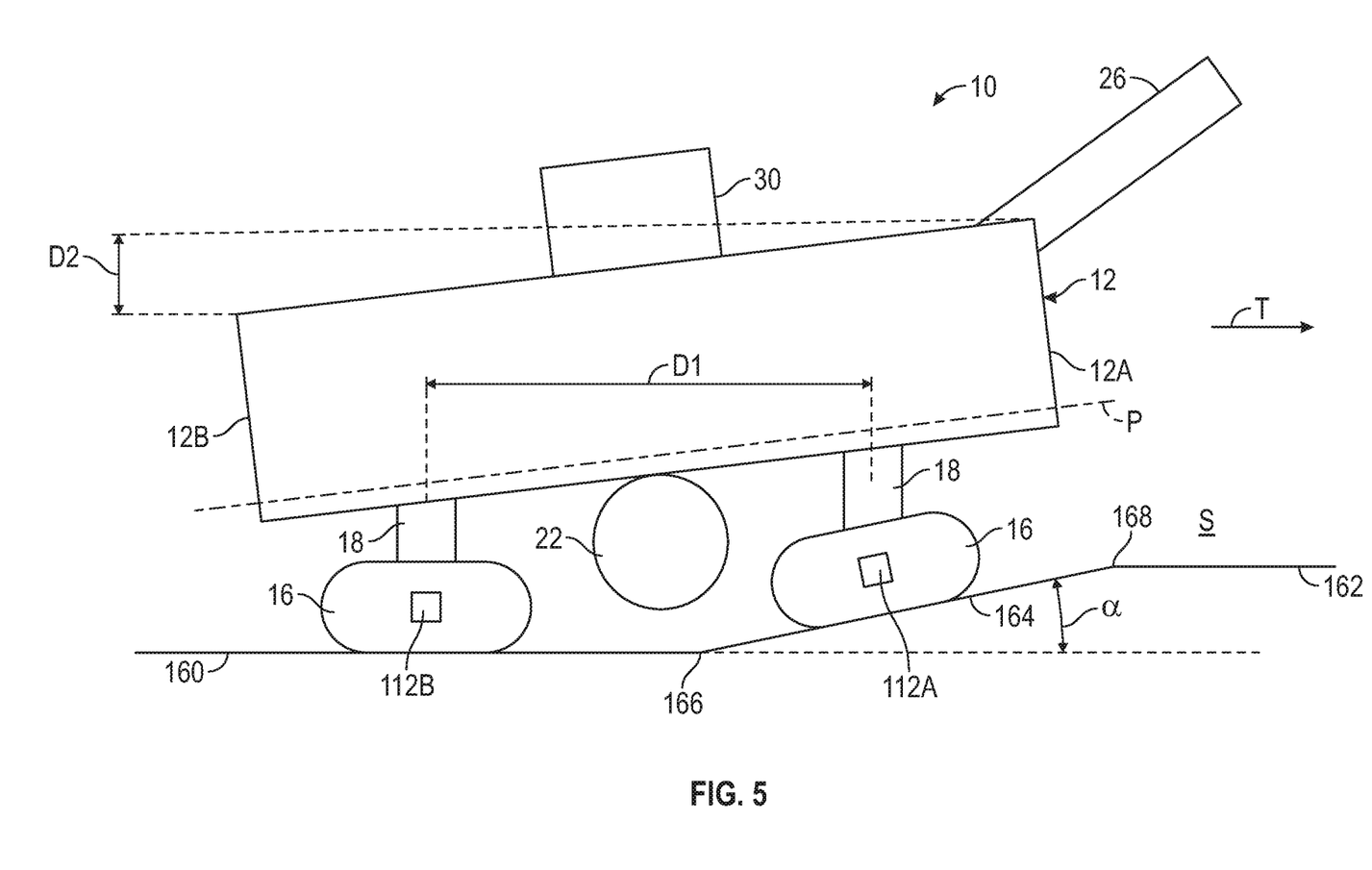
FIG. 5 is a schematic illustration showing rotation of the cold planer machine of FIG. 1 about the transverse axis while traversing an incline.

Controller 132 can be configured to adjust the position of lifting columns 18 to adjust first slope S1 and second slope S2 in order to maintain a desired orientation or attitude of frame 12 and cold planer machine 10. In examples, a desired orientation of frame 12 can be within a range of being parallel to or coextensive with reference plane P. In other words, the boundaries for frame 12 can be set at S1' and S1' and controller 132 can be configured to maintain frame 12 so that S1 and S2 do not exceed S1' and S2'. In examples, for a given machines size (e.g., length, width, height, center of gravity, etc.), S1' and S2' can be any stability angle relative to being parallel to reference plane P where a machine can safely maintain stability. Reference plane P can vary as machine 10 travels over different terrain. For example, if surface 102 is level, S1 and S2 will be zero. However, if surface 102 is sloped, one or both of S1 and S2 will be non-zero, as shown in FIG. 5. Such ranges can be determined based on knowledge of the terrain on which machine 10 is intended to operate, roll-over preventative measures programmed into controller 132, roll-over preventative means attached to frame 12 and the like. The present inventors have found that maintaining appropriate stability angles for S1' and S2' relative to parallel to reference plane P of frame 12 can provide a safe and smooth ride that is tolerable for an operator of machine 12, while reducing the potential for roll-over and not unduly limiting the ability of machine 10 to traverse uneven terrain. The selected tolerance band for reference plane P can be programmed into database 134. In examples, the tolerance band is factory-set and cannot be adjusted by an operator at operator interface 138. In other examples, the tolerance band can be selected, such as from a predetermined menu of suitable tolerance bands, at operator interface 138.

A desired orientation or attitude for frame 12 and cold planer machine 10 can be entered at operator interface 138 and stored in database 134 or a memory module of controller 132. As such, data from one or more of sensors 110A and 110B, position sensors 122 and auxiliary sensor 114 can be used to verify or confirm data from the others of sensors 110A and 110B, position sensors 122 and auxiliary sensor 114, either before or after action is taken. For example, orientation of frame 12 can be read from sensors 110A and 110B and compared with an operator-input orientation. Then, information from position sensors 122 can be used to adjust the position of lifting columns 18 to bring frame 12 back into, or within a tolerance band of, the operator-input orientation. Information from sensors 110A and 110B can be compared with information from auxiliary sensors 114 to verify correct and accurate operation of lifting columns 18. In other examples, information from sensors 110A and 110B can be used to verify information from auxiliary sensor 114. In yet other examples, information from sensors 110A and 110B and auxiliary sensor 114 can be compared to orientation information from position sensors 122 to verify orientation of frame 12 or operation of lifting cylinders 18. In other examples, information from auxiliary sensor 114 and position sensors 122, as well as information from propulsor sensors 112A and 112B, can be used if satellite signals for sensors 1104 and 110B are weak or unavailable, or can be used to determine when satellite signals for sensors 1104 and 110B are therefore becoming unreliable, such as for when spatial sensors 1104 and 1109 comprise GNSS sensors. In such cases, controller 132 can shift to performing ride control stabilizing operations based on input from auxiliary sensor 114, position sensors 122, and propulsor sensors 1124 and 1129, and ignoring input from sensors 110A and 110B until the output of sensors 110A and 110B is again available and reliable.

Controller 132 can be configured to actuate at least one of lifting columns 18 to raise or lower at least one of transportation devices 16. Controller 132 can communicate with the hydraulic system to extend or retract at least one of lifting columns 18 to reduce adjust first slope S1 and second slope S2. The selected legs to be actuated can be referred to as the actuatable leg(s). Controller 132 can actuate at least one of lifting columns 18 until the first slope S1 and the second slope are returned to the desired slope, e.g., less than or equal to S1' and S2'.

Controller 132 can determine positions of lifting columns 18 with reference to frame 12. The position of each of lifting columns 18 can correspond to a position between the maximum extended position and the maximum retracted position thereof. Each of lifting columns 18 can be at various positions based on the slope of cold planer machine 10, such as is set by the operator at operator interface 138.

In an example, one or more of lifting columns 18 can be at the extended position or the retracted position, or between the extended position and the retracted position. Controller 132 can determine the positions of lifting columns 18 based on the signals received from the one or more pairs of sensors 110, and in some cases, auxiliary sensor 114. Controller 132 can also communicate with the hydraulic system to determine the position of lifting columns 18. Controller 132 can actuate lifting columns 18 based on the positions of lifting columns 18 and the first slope S1 and second slope S2 of cold planer machine 10. In examples, if one of lifting columns 18 is in a fully extended position, then such lifting column cannot extend further to control the first slope S1 and the second slope S2. Similarly, if one of lifting columns 18 is in a fully retracted position, then such lifting column cannot retract further to control the first slope S1 and the second slope S2. Controller 132 can actuate at least one of or all of lifting columns 18 based on the positions of each of lifting columns 18 to control the first slope S1 and the second slope S2. In an example, if machine 10 is traversing an undulation wherein one of propulsors 16 enters a depression, controller 132 can operate to extend the lifting column 18 connected to that propulsor 16. Additionally, controller 132 can operate to simultaneously retract another of lifting columns 18 in order to, for example, reallocate distribution of hydraulic fluid within a hydraulic system operating lifting columns 18. For example, if the front left propulsor 16 enters a depression, the front right propulsor can be retracted, thereby lowering first end 12A of frame relative to second end 12B. However, controller 132 can maintain the overall orientation of frame 12 within the desired tolerance band relative to reference plane P. Alternatively, only one of extending and retracting different propulsors can be conducted with an accumulator in the hydraulic system being used, if beneficial.

FIG. 5 illustrates an example of cold planer machine 10 operating on surface S in accordance with systems and methods disclosed herein. As illustrated in FIG. 5, surface S can comprise first surface 160, second surface 162 and incline surface 164. Incline surface 164 can connect to first surface 160 and second surface 162 at points 166 and 168. Cold planer machine 10 can comprise frame 12, transportation devices 16, legs 18, milling drum 22, conveyor system 26, operator station 30, and propulsor sensors 112A and 112B, as are described herein.

Propulsor sensors 112A and 112B can comprise sensors that can determine the orientation of propulsors 16 relative to lifting columns 18. For example, propulsor sensors 112A and 112B can be configured to determine the rotation of propulsors 16 at pivot points where propulsors 16 rotate in coupling to lifting columns 18, such as on axes extending into the plane of FIG. 5. In examples, propulsor sensors 112A and 112B can comprise sensors similar in construction to auxiliary sensor 114, such as multi-axis sensor, gyroscopes and the like. As such, in examples, propulsor sensors 112A and 112B can comprise examples of auxiliary sensors.

According to embodiments herein, user interface 138 can receive a target orientation for frame 12, such as during a ride control operation when milling drum 22 is retracted toward frame 12. As such, transportation devices 16 can be operated to transport cold planer machine 10 across surface S between locations, such as a first location on surface 160 and a second location on surface 162 or vice versa. As discussed herein, sensors 110A and 110B, and auxiliary sensor 114 can be used to maintain frame 12 within a desired tolerance band of level. As such, first end 12A and second end 12B of frame 12 can be maintained approximately equidistant from work surface 24, within a tolerance hand, when operating on level ground. First end 12A and second end 12B can vary in position relative to work surface 24 due to undulations and variations in the level of work surface 24. Controller 132 can be configured to account for minor undulations, such as due to minor depressions from potholes or minor projections such as rocks. The position of legs 18 can be used to overcome such minor undulations. In particular, the orientation of frame 12 may not move outside of the tolerance band for the desired orientation of frame 12 relative to reference plane P. However, sometimes machine 10 may need to traverse more sizeable undulations, such as going up a hill or down into a valley. As such, first end 12A and second end 12B of frame 12 can go outside of the tolerance band, but within an acceptable position while the major undulation is traversed. Feedback from propulsor sensors 112A and 112B can be used to condition data from sensors 110A and 110B to, for example, prevent controller 132 from attempting to adjust legs 18 to level frame 12, such as when traversing an incline or decline.

In an example, information from propulsor sensors 112A and 112B can be used to interpolate slope data for surface 164. For example, incline surface 164 can be disposed at angle $\alpha$ relative to first surface 160. Database 134 can be provided with information regarding the geometry of frame 12 to determine the relative positions of first end 12A and 12B. Controller 132 can use angle $\alpha$ and distance D1 between forward leg 18 and rearward leg 18 to calculate the difference in height D2 of propulsors 16, and first end 12A and second end 12B, relative to first surface 160.

For explanation purposes herein, first surface 160 and second surface 162 can be considered to be flat surfaces with first surface 160 having a grade of zero and second surface having a positive grade above first surface 160. Incline surface 164 can be flat with an increasing grade to connect surfaces 160 and 162.

During a ride control operation, milling drum 22 can be retracted away from surface 160 by operation of lifting columns 18 and the position of frame 12 can be controlled by controller 132 by monitoring input from sensors 110A and 110B, auxiliary sensor 114 and position sensors 122. Cold planer machine 10 can move in a forward direction on first surface 160, Initially both the front and rear lifting columns 18 can be extended the same amount while on surface 160. At some point, forward lifting columns 18 will engage incline surface 164 at point 166. As such, the orientation of frame 12 will change from being parallel to surface 160. If frame 12 moves outside of the desired tolerance band to traverse incline surface 164, according to operations described herein, controller 112 can actuate lifting columns 18 in an attempt to bring frame back to level with surface 160. However, controller 132 may not be aware that machine 10 is traversing incline surface 164. In such case, it can be desirable to maintain the tolerance band relative to incline surface 164 rather than surface 160. As such, information from propulsor sensors 112A and 112B can be used to inform controller 132 of the local topography of work surface 24 (FIG. 1), e.g., that work surface 24 comprises surfaces 160, 162 and 164 at the location of machine 10. Thus, as the forward propulsor 16 rolls up incline surface 164, the propulsor 16 will pivot relative to the forward lifting column 18 on a pivot axis. Propulsor sensor 112A can sense the rotation of propulsor 16. Thus, controller 132 can be programmed to interpret a change in D2 sensed by sensors 110A and 110B, along with a corresponding change in output from propulsor sensor 112A, as indicating that frame 12 is traversing incline surface 164. Controller can continue to monitor output of propulsor sensor 112A, such as when propulsor 16 traverses point 168, and, using the geometry of frame 12 and lifting columns 18, determine the length and angle of incline surface 164 to appropriately adjust the position of reference plane P to, for example, continuously adjust the tolerance band produced by S1' and S2'.

Controller 132 can extrapolate slope information in real-time (based on data from sensors 110A and 110B and in some cases, auxiliary sensor 114 and propulsor sensors 112A and 112B) and can make real-time adjustments to the attitude of frame 12 and cold planer machine 10, via lifting columns 18, to maintain various parameters, such as a preferred or desired orientation of frame 12 or cold planer machine 10 that 1) maintains a desired cut orientation of milling drum 22, 2) provides a comfortable, smooth ride for an operator of cold planer machine 10 located at platform 30, 3) maintain the stability of cold planer machine 10 [such as within a predetermined tolerance band relative to horizontal or reference plane P], and other considerations.

Controller 132 can use information gathered from sensors 110A and 110B, and in some cases, auxiliary sensor 114, to maintain a desired cut orientation of milling drum 22 by maintaining a ground inclination of frame 12 relative to the ground. The ground inclination can thus be set so that milling drum 22 performs all machine leveling functions for cold planer machine 10, such as but not limited to, milling, obstacle jump, synchronous leg control, and grade and slope In an example, an operator can enter an input into interface 138 to place machine 10 into a ride control mode where milling drum 22 is retracted, the operator can enter into interface 138 a desired speed for machine 10, operator interface 138 can display a visual indication of the speed of machine 10 and the status, e.g., length of each of lifting columns 18, controller 132 can receive input from sensors, such as sensors 110A and 110B to monitor the inclination of frame 12, controller 132 can receive input from sensors, such as auxiliary sensor 114 and propulsor sensors 112A and 112B to cross-check input from sensors 110A and 110B, operator interface 138 can display changes in the orientation of frame 12, such as relative to a safety box or tolerance band for the orientation of frame 12 relative to a reference plane, operator interface 138 can provide a visual indication or alarm that frame 12 has, is or will be moving out of the safety box or tolerance band, and operator interface 138 can automatically adjust lifting columns 18 to move frame 12 back to within the safety box or tolerance band or an operator can enter one or more inputs into operator interface 138 to manually adjust one or more lifting columns 18 to move frame 12 back to within the safety box or tolerance band.

INDUSTRIAL APPLICABILITY

The present application describes various systems and methods for observing and controlling vertical movement of machines including individually mounted propulsion elements or transportation devices. The propulsion elements or transportation devices can be mounted to lifting columns, such as hydraulic cylinders, that can be controlled with a hydraulic system. For example, any or all hydraulic cylinders of a propulsion system can be individually operated to maintain a desired inclination, orientation or attitude of the machine. The inclination, orientation or attitude of the machine can be measured by one or more spatial sensors, with or without auxiliary information, such as from a slope sensor mounted to a frame of the machine or another location and propulsor sensors mounted to sense an orientation of a propulsor, and displayed on an operator control panel. Orientation of the frame of the machine can be measured by spatial sensors and displayed on an operator control panel. The position of the hydraulic cylinders can be measured by position sensors mounted to or within the hydraulic cylinders and displayed on an operator control panel. Information or data from the slope sensor, spatial sensors and position sensors can be used in real-time or a near real-time basis to continuously observe and adjust the length of the lifting columns to maintain the desired inclination, orientation or attitude of the machine, such as automatically with a machine controller or manually using operator inputs. The desired orientation of the machine can be correlated, such as by an operator, to 1) maintain a desired cut orientation of a milling drum, 2) provide a comfortable, smooth ride for an operator of the machine located at an operator platform, 3) maintain stability of machine to prevent rollover), and other considerations.

What is claimed is:
1. A machine for road work, the machine comprising:
a frame;
a plurality of ground engaging units;
a plurality of vertically moveable legs, each leg connecting one of the plurality of ground engaging units to the frame;
a pair of spatial sensors, each spatial sensor of the pair of spatial sensors configured to generate an output signal representing a three-dimensional position obtained from a satellite navigation or positioning system; and
a controller configured to, in response to the output signal received from each of the spatial sensors, activate at least some of the plurality of vertically moveable legs to control slope of the frame to remain within a tolerance band of a selected attitude, the tolerance band selected to maintain stability of the machine for road work.

2. The machine for road work of claim 1, wherein the pair of spatial sensors comprise a pair of GNSS sensors coupled to the frame.

3. The machine for road work of claim 2, wherein the pair of spatial sensors are located on diagonal corners of the frame.

4. The machine for road work of claim 1, further comprising one or more slope sensors configured to sense a rotational orientation of the frame, wherein each of the one or more slope sensors comprises a dual-axis sensor configured to provide a cross-check to the output signals of the pair of spatial sensors.

5. The machine for road work of claim 4, wherein the one or more slope sensors are coupled to the frame.

6. The machine for road work of claim 1, further comprising position sensors coupled to the plurality of vertically moveable legs configured to sense a length of each of the plurality of vertically moveable legs.

7. The machine for road work of claim 1, further comprising propulsor sensors coupled to the plurality of ground engaging units configured to sense an orientation of each of the ground engaging units relative to a vertically moveable leg to which each of the ground engaging units is attached.

8. The machine for road work of claim 1, wherein the controller is configured to activate at least some of the plurality of vertically moveable legs to level the frame.

9. The machine for road work of claim 1, wherein the controller is configured to activate at least some of the plurality of vertically moveable legs to maintain the attitude of the frame within the tolerance band that comprises a stable orientation of the machine for road work that prevents roll-over, wherein the tolerance band is calculated relative to an inclined surface being traversed by the machine for road work to maintain stability in front-to-back and left-to-right orientations.

10. The machine for road work of claim 1, wherein the controller is configured to, in response to sensing a change in a cross slope of the machine, activate at least one of the plurality of vertically moveable legs to move up and an opposite one of the plurality of vertically moveable legs to move down.

11. The machine for road work of claim 1, wherein the controller is configured to activate all of the plurality of vertically moveable legs in real-time.

12. The machine for road work of claim 1, wherein the controller is configured to activate the at least some of the plurality of vertically moveable legs while a milling assembly mounted to the frame is in a non-operating state.

13. A method of maintaining attitude of a construction machine having a propulsion system including multiple independent propulsors, the method comprising:

traversing a ground surface having a changing topography with the multiple independent propulsors;

sensing changing slope of the construction machine using at least one pair of spatial sensors attached to the construction machine, each spatial sensor of the at least one pair of spatial sensors configured to generate an output signal representing a three-dimensional position obtained from a satellite navigation or positioning system, wherein changing slope of the construction machine is sensed by comparing the output signal of each spatial sensor of the at least one pair of spatial sensors to each other;

calculating a deviation of an attitude of the machine from a selected attitude by comparing the sensed changing slope of the construction machine determined from the output signals of both of the at least one pair of spatial sensors to the selected attitude; and adjusting a height of at least one of the multiple independent propulsors to return the attitude of the machine to within a tolerance band of the selected attitude.

14. The method of claim 13, wherein the selected attitude comprises an orientation relative to an operator located on the construction machine.

15. The method of claim 13, wherein the selected attitude comprises a stable orientation of the construction machine that prevents roll-over.

16. The method of claim 13, wherein adjusting the height of the multiple independent propulsors to return the attitude of the machine to the selected attitude occurs in real-time.

17. The method of claim 13, wherein adjusting the height of the multiple independent propulsors to return the attitude of the machine to the selected attitude occurs while a milling assembly mounted to the construction machine is in a non-operating state.

18. The method of claim 13, wherein sensing changing slope of the construction machine includes using a slope sensor in combination with at least one pair of GNSS sensors comprising the at least pair of spatial sensors, and the slope sensor is attached to the construction machine.

19. The method of claim 13, wherein sensing changing slope of the construction machine includes using a position sensor in combination with at least one pair of GNSS sensors comprising the at least one pair of spatial sensors, and the position sensor is configured to sense a length of a lifting column attached to one of the multiple independent propulsors.

20. The method of claim 13, wherein sensing changing slope of the construction machine includes using an orientation sensor in combination with at least one pair of GNSS sensors comprising the at least one pair of spatial sensors, and the orientation sensor is configured to sense an orientation of one of the multiple independent propulsors relative to a lifting column attached to the one of the multiple independent propulsors.

* * * * *